United States Patent [19]
Wilson et al.

[11] Patent Number: 5,162,275
[45] Date of Patent: Nov. 10, 1992

[54] LOW TEMPERATURE KILN CARBON REACTIVATION

[75] Inventors: Robert A. Wilson; J. Leroy Peterson, both of Salt Lake City, Utah

[73] Assignee: Custom Equipment Corporation, Salt Lake City, Utah

[21] Appl. No.: 307,136

[22] Filed: Feb. 6, 1989

Related U.S. Application Data

[60] Continuation of Ser. No. 17,470, Feb. 20, 1987, abandoned, which is a continuation of Ser. No. 794,952, Nov. 1, 1985, abandoned, which is a continuation of Ser. No. 611,147, May 17, 1984, abandoned, which is a division of Ser. No. 381,426, May 24, 1982, Pat. No. 4,462,870.

[51] Int. Cl.$^5$ .................. C01B 31/08; B01J 20/34; F27D 17/00
[52] U.S. Cl. .................................. 502/56; 34/36; 34/168; 432/102; 432/179; 502/34
[58] Field of Search .................... 502/34, 55, 56, 514

[56] References Cited

U.S. PATENT DOCUMENTS

| | | | |
|---|---|---|---|
| 685,336 | 10/1901 | Leroy et al. | 432/102 |
| 1,617,960 | 2/1927 | Muller | 34/36 |
| 2,805,189 | 9/1957 | Williams | 204/124 |
| 4,007,014 | 2/1977 | Matsumoto et al. | 202/120 |
| 4,008,994 | 2/1977 | Numasaki et al. | 432/102 |
| 4,120,644 | 10/1978 | Numasaki et al. | 432/102 |
| 4,221,560 | 9/1980 | Idei et al. | 432/102 |
| 4,224,286 | 9/1980 | Murase et al. | 422/204 |
| 4,374,092 | 2/1983 | Marquess et al. | 422/232 |

FOREIGN PATENT DOCUMENTS

| | | | |
|---|---|---|---|
| 25829/30 | 3/1930 | Australia . | |
| 7/31 | 1/1931 | Australia . | |
| 15714 | 5/1978 | Japan | 422/204 |
| 95184 | 8/1978 | Japan | 502/56 |
| 129605 | 10/1981 | Japan | 502/56 |

*Primary Examiner*—Paul E. Konopka
*Attorney, Agent, or Firm*—Trask, Britt & Rossa

[57] ABSTRACT

Particulate carbon is reactivated by heating it for an effective reactivation time at a reactivation temperature in a stationary vertical annular heating zone of an unlined metal kiln.

7 Claims, 1 Drawing Sheet

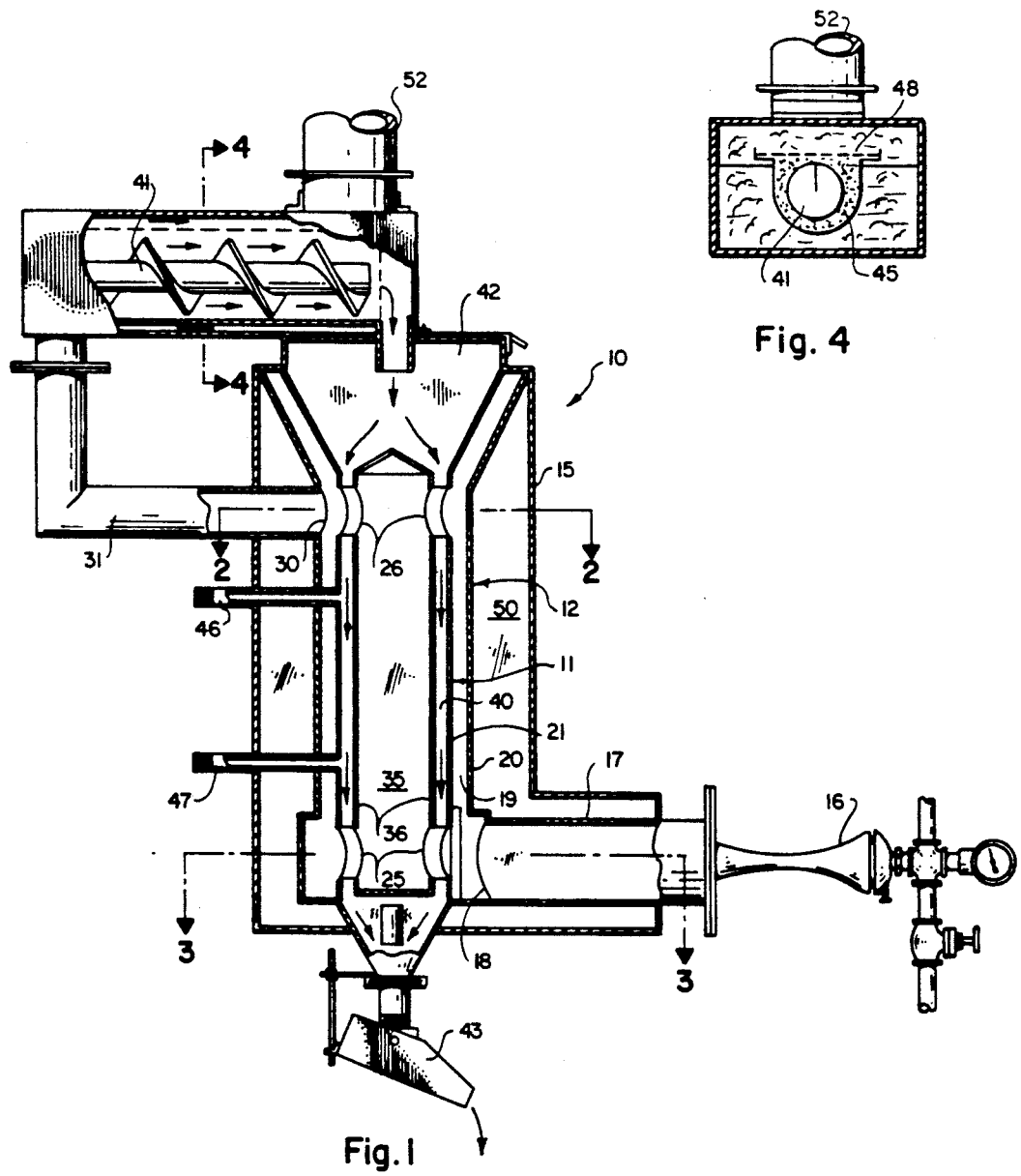
Fig. 4
Fig. 1
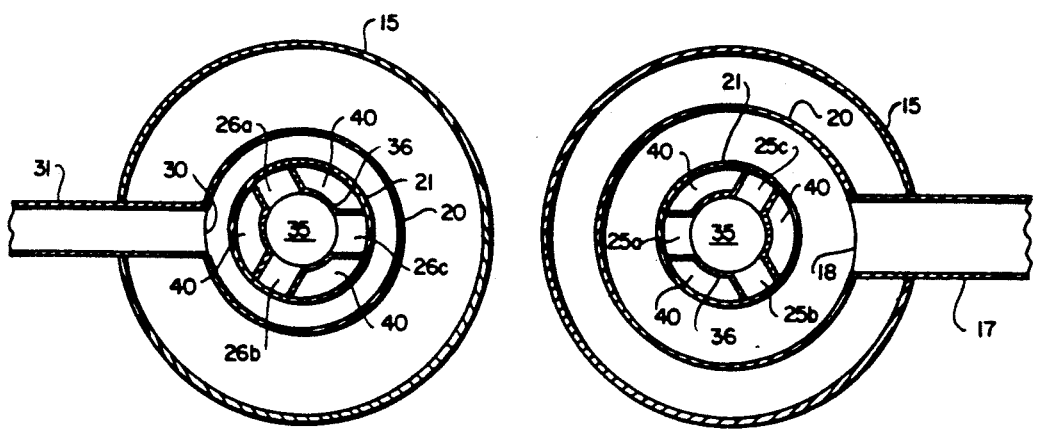
Fig. 2
Fig. 3

LOW TEMPERATURE KILN CARBON REACTIVATION

This application is a continuation of application Ser. No. 017/470, filed Feb. 20, 1987, now abandoned which is a continuation of Ser. No. 794,952 filed Nov. 1, 1985, now abandoned, which was a continuation of Ser. No. 611,147 filed May 17, 1984, now abandoned, which was a divisional of Ser. No. 381,426 filed May 24, 1982, now U.S. Pat. No. 4,462,870.

BACKGROUND OF THE INVENTION

1. Field

This invention relates to kilns and is directed to a relatively low temperature kiln useful for reactivating carbon.

2. State of the Art

Kilns of various types are in use. Lined kilns are generally operated at very high temperatures to drive moisture, including water of hydration, from substances such as limestone. Activated carbon, after use, is often recycled through an indirect-fired, unlined, rotary kiln for reactivation. Such unlined kilns are of necessity operated at relatively much lower temperatures.

The moving parts of a typical rotary kiln, e.g., the rotating shell, trunnion and thrust roll assembly, drive assembly (consisting of motor, reducer, gears or chain and sprocket), trunnion roll assembly and breeching seals, require servicing, such as lubrication, adjustment of alignment and replacement due to wear or buckling.

Rotary kilns used for the reactivation of carbon are typically about 20 to about 30 inches in diameter and about 20 to about 35 feet in length. They occupy considerable building volume, and provisions for replacement of the rotating shell require the existence of clear space in line with the kiln to allow removal of the shell from its stationary housing.

SUMMARY OF THE INVENTION

The present invention provides a kiln especially adapted to heat particulate materials, notably carbon. Its structure and operation differ significantly from conventional kilns. It can be operated at temperatures higher than those normally maintained in the unlined rotary kilns currently used to reactivate carbon. These higher temperatures contribute to the method of this invention for reactivating carbon.

The kilns of this invention are constructed of metal, and in most instances are operated without refractory linings in the heating zone. An approximately annular heating zone is structured from metallic inner and outer walls. The inner wall itself defines an interior space adapted to accept and discharge heated fluids (typically hot combustion gases). The inner and outer walls are heated to a high temperature, usually above about 1000° F. but below the softening point of the materials of construction of the inner and outer walls of the vessel. In this fashion, the annular heating zone is brought up to a selected reaction temperature. A reaction temperature as high as about 1500° F. is practical, but more typically, operating temperatures for the reactivation of carbon are selected from within the range of about 1100° to about 1250° F.

Means are provided for introducing particulate material to the top of the vessel and for discharging that material from the bottom of the vessel at a controlled rate so that material introduced to the top migrates by gravity down through the heating zone during a selected residence time. For example, carbon may be reactivated effectively in the kiln operating at about 1200° F. with a residence time of between about ¼ to about ½ hour. The heating zone remains stationary during operation. Accordingly, the apparatus of this invention may be regarded as a "static kiln".

The preferred embodiments of the kilns of this invention include an enclosure for the vessel described. This enclosure is structured to define a plenum substantially surrounding the outer wall of the vessel. Hot fluid introduced at the bottom of the enclosure thus moves up along the outer wall to transfer heat through the wall to the heating zone. Ideally, means are provided for transferring a portion of the hot fluid relied upon for transferring heat to the heating zone between the plenum and the aforementioned interior space. In this way, heating medium need only be introduced at one location to heat both the inner and outer boundaries of the heating zone. The preferred heating medium is heated gas, usually combustion gas. A suitable means for transferring portions of such gas to assure contact with both the inner and outer walls of the vessel comprises a plurality of ducts or channels extending between those walls and sealed from the annular heating zone. The channels are sized and spaced from each other so as to permit unimpeded migration of particulate material through the heating zone.

Although a variety of expedients are practical for introducing feed material to the top of the vessel, it is often desirable to associate the kiln with structure adapted to preheat and/or dry this material prior to its introduction to the heating zone. In many cases, substantially over half of the total heat requirement for the reactivating of carbon is associated with the removal of excess moisture from the feed material. Various hopper and conveyor arrangements are within contemplation. It is often useful to capture hot gases exiting the kiln for conveyance to associated apparatus utilized for storing or transporting the feed material. The heat from the gas can then be utilized; for example, by direct or indirect contact with the feed material.

DESCRIPTION OF THE DRAWINGS

In the drawings, which illustrate that which is presently regarded as the best mode for carrying out the invention:

FIG. 1 is a view in side elevation, partly in section, illustrating one embodiment of a static kiln of this invention;

FIG. 2 is a view of the apparatus of FIG. 1 in cross-section, taken at the reference line 2—2 of FIG. 1, viewed in the direction of the arrows;

FIG. 3 is a view of the apparatus of FIG. 1 in cross-section, taken at the reference line 3—3 of FIG. 1, viewed in the direction of the arrows; and FIG. 4 is a view of the apparatus of FIG. 1 in cross-section, taken at the reference line 4—4 of FIG. 1, viewed in the direction of the arrows.

DESCRIPTION OF THE ILLUSTRATED EMBODIMENT

The drawing illustrates a static kiln, designated generally 10, including a vessel, designated generally 11, suspended within an enclosure, designated generally 12. These components are supported from their tops by means of a suitable structure, such as the external housing 15 shown. The housing 15 is ordinarily rigidly mounted to permanent supports (not shown), but the vessel 11 and enclosure 12 are desirably suspended to accommodate expansion and contraction movements.

A conventional burner 16 is mounted in registration with a duct 17 which terminates in a port 18 in open communication with the plenum 19 defined by the wall 20 of the enclosure 12 and the outer wall 21 of the vessel 11. As illustrated, the plenum is sealed except for the burner port 18, the interior channels 25 near the bottom of the vessel 11 and 26 near the top of the vessel 11, and a flue port 30 in registration with a flue pipe 31 near the top of the enclosure 12. As is apparent from FIG. 1 of the drawings, combustion gases entering through the burner port 18 must inevitably exit through flue port 30 following circulation through the plenum 18, adjacent the outer wall 21 of the vessel 11 and through the interior space 35, adjacent the inner wall 36 of the vessel 11.

FIGS. 2 and 3 illustrate an arrangement of circulation channels 25, 26 which avoids short circuiting of the flow pattern of hot gases between the ports 18 and 30. It will be noted that the walls 21 and 36 of the vessel 11 define an approximately annular heating zone 40. The channels 25, 26 provide circulation paths for burner gases initially introduced to the plenum 18 into and out of the interior space 35. As best shown by FIG. 3, the lower channels 25 comprise a plurality of radial ducts 25a, 25b, 25c, approximately equally spaced at approximately the level of the burner port 18 but oriented so that none of them is in registration with the port 18. Accordingly, the gases are forced to circulate around the wall 21 to gain entry to the interior space 35. Referring to FIG. 2, the upper channels 26 similarly comprise a plurality of radial ducts 26a, 26b and 26c approximately equally spaced at approximately the level of the flue port 30 oriented so that none of them is in registration with the port 30. Gases exiting the ducts 26a, 26b and 26c thus circulate around the upper portion of the wall 21 to the flue port 30.

Particulate material is conveyed, e.g., by the screw conveyor 41 shown, to a hopper 42 at the top of the vessel 11. It migrates by gravity flow past the upper circulation channels 26 through the heating zone 40 and around the lower circulation channels 25, eventually exiting through a regulator 43 adapted to control the rate of discharge, thereby to establish the residence time of the material in the heating zone 40. It should be noted that the interior of the zone 40 is substantially filled with material during operation of the claimed device.

A pair of sampling tubes 46, 47 are provided from outside the support structure 15 in open communication with the heating zone 40. These tubes 46, 47 provide means for sensing the temperature at various regions within the zone. According to certain embodiments, suitable insulating material (not shown) is placed external the wall 20 within the space 50.

Flue pipe 31 conveys flue gases to transfer heat to particulate feed material prior to its introduction to the hopper 42. In the illustrated instance, as best shown by FIGS. 1 and 4, the flue gas flows outside the screw housing 45, substantially out of direct contact with the material transported by the screw conveyor 41. The gases also move across the top of a screen 48 and mix with steam driven from the conveyed material. The combined steam and flow gases eventually exit from a duct 52. Other auxiliary devices may be used to provide for more complete heat exchange, if desired. The residence time of the feed material in the drying apparatus, and the specific design of the drying apparatus itself are selected to effect the desired moisture content in the feed material entering the reaction zone 40. In the case of particulate carbon, some amount of moisture in the feed has a beneficial effect on the reactivation process. The minimum moisture level which is effective to optimize the reactivation of a particular feed material is readily determined in the field. Once this effective moisture content is determined, the operating parameters of the drying apparatus may be established in conventional fashion to produce a corresponding feed material.

The kilns of this invention may be constructed in various configurations and sizes. It is usually preferred that the ratio of surface area to annular volume of the vessel 11 be large to provide for efficient heating and to maintain the temperature throughout the zone 40 uniform. The heat-transfer contact area provided by each linear foot of the reaction zones of this invention are generally at least about 5 to more than 15 times the corresponding contact areas of conventional rotary kilns. The practical bed thickness for treatment by the claimed invention is at least as great as that of conventional kilns with much greater uniformity of bed temperature. As a general rule, the spacing between the walls 21, 36 should be sufficient to avoid clogging, but sufficiently close to maintain a narrow temperature differential, typically less than about 25° C. within the material across any horizontal section of the same zone.

The cross-sectional area of the plenum 18 and the interior space 35 should be selected to assure balanced heating of the interior wall 36 and exterior wall 21.

Example I

A sample of dirty 12 mesh × 30 mesh coconut carbon was obtained from a carbon and pulp gold recovery plant. A portion of this sample was subjected to a standard test procedure whereby it was agitated in a cyanide slurry, the aqueous phase of which assayed 14.8 ppm (parts per million) Au and 3.9 ppm Ag. The carbon so tested indicated negative adsorption. (That is, gold and silver were dissolved from the carbon into the slurry.)

A static kiln was constructed generally as illustrated in the drawing, except that it lacked the automated feed system shown. The kiln used had a heating zone capacity of about 1.15 cubic feet, with a cross-sectional area of about 0.4 square feet. The heating zone was heated to about 650° C. as measured at the upper sample tube 46 and about 800° C. as measured at the lower tube 47. The zone was kept heated to within that range as monitored by thermocouples. A first portion of the sample carbon passed through the zone at a rate of 480 grams per minute (a residence time of about 29 minutes). A second portion was passed through the zone at a rate of 350 grams per minute (a residence time of about 40 minutes). The two thus-estimated samples were subjected to the same test procedure as the original dirty material. Comparative results are given in Table 1.

TABLE 1

| | Adsorption Efficiency Percent | |
|---|---|---|
| | Gold | Silver |
| Unheated | 0 | 0 |
| 650–800° C. | | |
| I - 480 grams per min. | 62.9 | 46.2 |
| II - 350 grams per min. | 96.1 | 99.0 |

The foregoing example illustrates a process for the reactivation of carbon which may be generalized as: the provision of an annular heating zone defined by inner and outer walls oriented approximately vertically; heating the inner and outer walls to raise the temperature within the annular space to a selected reactivation temperature (typically between about 1000° and about 1500° F., but preferably between about 1100° and about 1250° F.); introducing particulate carbon (typically within the range of about 6×16 mesh course to about 12×30 mesh fine to the zone to substantially fill the zone; and discharging the carbon from the zone at a rate selected to provide sufficient residence time of the carbon within the zone to effect reactivation of the carbon. The residence time selected will depend somewhat upon the temperature of the zone, but at a temperature of about 1200° F., a residence time of less than an hour, typically about ¼ to about ½ hour is adequate. Desirably, the moisture content of the feed material is adjusted to near the minimum effective residence time amount prior to its introduction to the reaction zone. Typically, the moisture content of the feed should be between about 5 to about 15 percent by weight, although greater amounts do not adversely affect the reactivation process provided the residence time within the zone is appropriately increased.

Reference herein to details of the illustrated embodiments is not intended to limit the scope of the appended claims, which themselves recite those features regarded as essential to the invention.

We claim:

1. A method for reactivating carbon consisting of:
   providing a vented housing having an exterior surface;
   placing particulate carbon, having a moisture content, within said housing;
   passing a first heated gas over said exterior surface of said housing to heat said carbon while retaining said first gas out of direct contact with said carbon;
   venting steam produced within said particulate carbon by said heating until said carbon moisture content is reduced to between about 5 to about 15 percent by weight;
   providing an annular heating zone defined by metallic inner and outer walls having exterior surfaces oriented approximately vertically, said inner and outer walls being sealed from said annular heating zone;
   heating said inner and outer walls by passing a second heated gas over said exterior surface of said walls, thereby heating an annular space between said inner and outer walls to a selected reactivation temperature between about 1000° F. and 1550° F.;
   introducing said carbon to a top of said annular heating zone, thereby to substantially fill said zone with carbon;
   discharging heated carbon from a bottom of said annular heating zone at a rate selected to provide a residence time of said carbon within said zone less than one hour to effect reactivation of said carbon.

2. The method of claim 1 wherein the temperature differential of less than approximately 25° C. is maintained across any horizontal section of said zone.

3. The method of claim 1 wherein the temperature throughout said zone is maintained uniform.

4. The method of claim 1 wherein said residence time is between about ¼ to ½ hour.

5. The method of claim 1 wherein said heating zone is maintained filled with carbon during the working of said method.

6. The method of claim 1 wherein said first gas and said second gas are one and the same gas.

7. A method for reactivating carbon consisting of:
   providing a vented housing having an exterior surface;
   placing particulate carbon, having a moisture content, within said housing;
   passing a first heated gas over said exterior surface of said housing, to heat said carbon, while retaining said first gas out of direct contact with said carbon;
   venting steam produced within said housing by said heating away from said carbon, thereby reducing said moisture content;
   providing an annular heating zone defined by metallic inner and outer walls, having exterior surfaces oriented approximately vertically, said inner and outer walls being sealed from said annular heating zone;
   heating said inner and outer walls by passing a second heated gas over said exterior surface of said walls, thereby heating an annular space between said inner and outer walls to a selected reactivation temperature;
   introducing said carbon to a top of said annular heating zone to substantially fill said zone with carbon;
   discharging heated carbon from a bottom of said annular heating zone at a rate selected to provide a residence time of said carbon within said zone sufficient to effect reactivation of said carbon.

* * * * *